Patented June 24, 1930

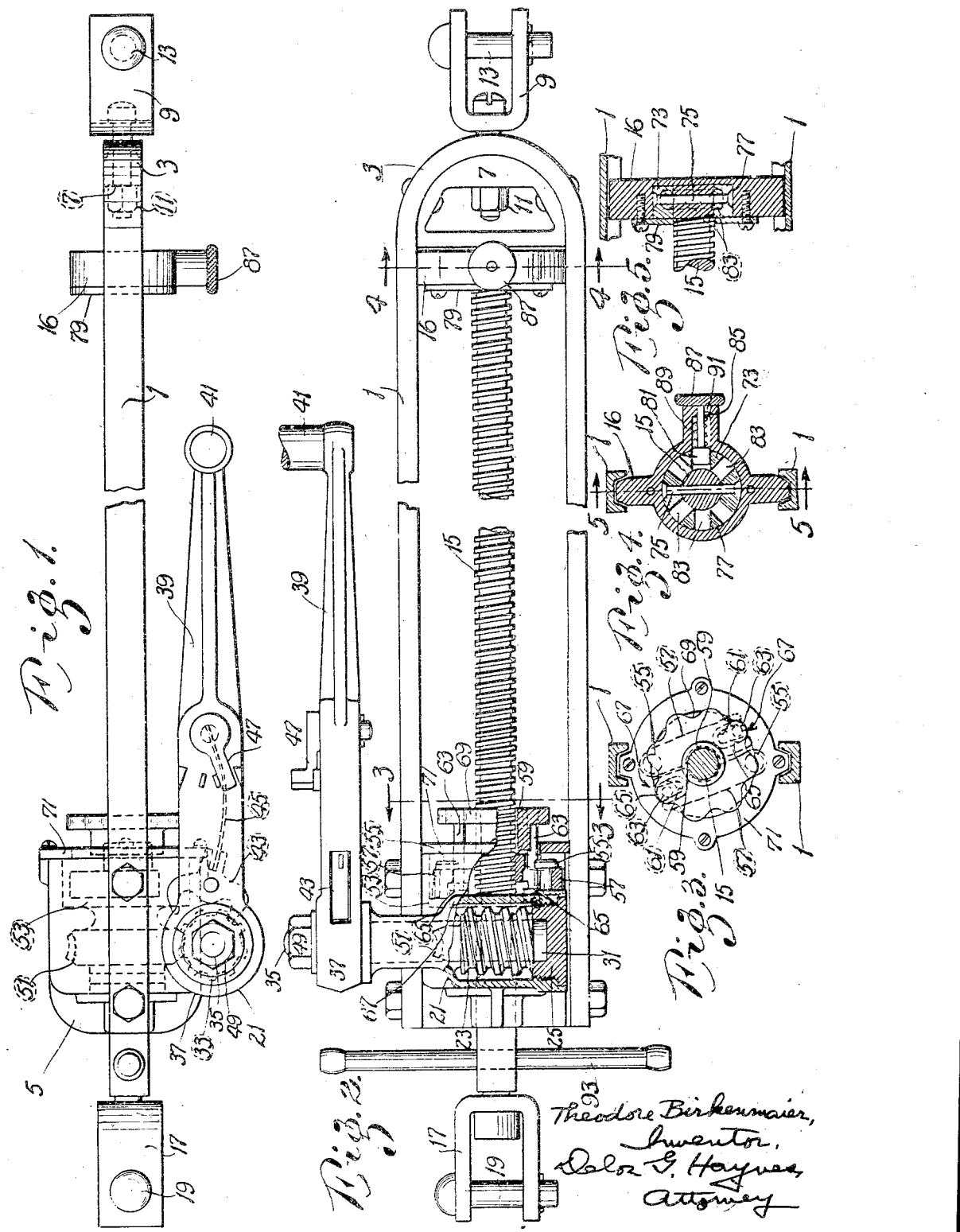

1,766,504

UNITED STATES PATENT OFFICE

THEODORE BIRKENMAIER, OF ST. LOUIS, MISSOURI, ASSIGNOR TO W. N. MATTHEWS CORPORATION, OF ST. LOUIS, MISSOURI, A CORPORATION OF MISSOURI

SLACK PULLER

Application filed October 12, 1927. Serial No. 225,645.

This invention relates to slack pullers, and with regard to certain more specific features, to slack pullers of the split-nut type.

Among the several objects of the invention may be noted the provision of a slack puller having three modes for taking up slack, namely, (1) a direct take up including no mechanical advantage, (2) a screw take up, and (3) a geared take up; whereby three modes of operation may be advantageously accomplished, namely, (1) quickly reducing very loose slack after coupling the slack puller, (2) quickly taking up ordinary slack with a substantial degree of force, and finally, (3) more slowly taking up substantially all remaining slack with great force; and the provision of a device of the class described which is simple and rugged in construction and readily operable. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a side elevation of a slack puller;

Fig. 2 is a front elevation thereof, parts being broken away;

Fig. 3 is a cross section taken on line 3—3 of Fig. 2;

Fig. 4 is a cross section taken on line 4—4 of Fig. 2; and,

Fig. 5 is a fragmentary longitudinal section taken on line 5—5 of Fig. 4.

Similar reference characters indicate corresponding parts throughout the several views of the drawings.

Referring now more particularly to Fig. 1, there is illustrated at numeral 1 a channel iron or like frame bent to an arc of one hundred and eighty degrees at a section 3 thereof. The section 3 is located substantially midway between the two ends of the channel 1. The two ends of said channel 1 are bolted to a casting 5. The mid-section 3 of the channel 1 has a bracing boss 7 riveted thereto for the purpose of carrying a swiveled clevis 9. The clevis 9 is held by means of a conventional nut-and-bolt combination 11 and carries a coupling pin 13 for purposes of fastening it to cable ends and the like.

Longitudinally located with respect to the channel 1 is provided a take-up or draw screw 15 having a square or like type of thread cut thereon. Any type of thread of proper strength may be used. The screw 15 passes through the casting 5 and the parts associated therewith (to be described) and emerges at the lower end of the device. It is provided at its outside or lower end with a preferably swiveling clevis 17, which carries a coupling pin 19 for the purpose of fastening to another end of the cable to be stretched. The other end of the screw 15 normally has a cross-head 16 pinned thereto which slidably engages the grooves of the sides of the channeled frame 1. The screw 15 therefor cannot normally rotate; but it may move longitudinally.

The casting 5 carries a reducing gear and a split nut driven thereby, adapted to engage and disengage the said screw 15.

Referring now more particularly to Figs. 1 and 2, there is shown a sidewardly extending portion 21 of the casting 5, formed integrally therewith. The portion 21 is hollowed to receive a worm gear 23 and a thrust bearing 25 therefor. The thrust bearing 25 is also adapted to form a cap which is screwed into place after the worm gear 23 is positioned within the portion 21.

The gear 23 is keyed or otherwise fastened to a shaft 31. This shaft 31 passes outwardly from the portion 21 and is there provided with a ratchet wheel 33 fastened tightly thereto. Rotatably borne on a stub end 35 of the shaft 31 is a ratchet housing 37 of a crank arm 39. The crank arm 39 is provided with a conventional hand grip 41. Within the housing 37 is pivoted a pawl 43. The pawl 43 is provided with two lugs either one of which may engage the teeth of the ratchet 33. A spring 45 reacts from a point in the housing 37 opposite the pivot of the pawl, against said pawl at a point near and above the pivot. It is evident that if the spring 45 be initially in a state of strain, that the pawl 43 will tend to be over-centered either one way or the other, depending upon the initial lateral curvature manually given to the spring 45. This initial curvature is given to the spring by setting the pawl in either of the driving positions desired, and for this purpose it can be moved by means of a lever 47.

By the above described means the worm gear 23 may be rotated in either direction and its rotation for driving under a stretching load is such that the thrust bearing 25 receives the end thrust. When the device is slacked off from its work the thrust is in the opposite direction but no refined bearing is then required, because of the light load under such conditions. A nut 49 prevents the crank 39 from being inadvertently endwardly removed.

The gear 23 meshes with a worm wheel 51 cut or otherwise formed integrally with a base 53 adapted to rotate with said worm wheel 51. The base portion 53 is provided with two oppositely disposed and upstanding pins 55 pivotally supporting opposite nut halves or arms 57, said halves comprising a split nut. Each half 57 is in the form of an arm rotatable about its pivot 55 and forming a half nut 59. Each of the half nut portions are inwardly threaded to engage with said threads of the take-up screw 15.

It is to be understood that there is no direct engagement between the worm wheel 51 or the connected base portion 53 on one hand and the screw 15 on the other hand. The screw 15 passes through central openings in these portions 51 and 53, and connects with them only indirectly when the nut portions 57 are engaged with it.

In order to provide means for disengaging the nut portions 59 from the screw 15, there is provided at the outer end of each arm 57 a slot 61 through which passes a pin 63 having a lower head 65 suitably counter-sunk in the bottom surface of the said slotted end of each arm 57. The purpose of counter-sinking the heads 65 is to prevent them from being accidentally pulled out from the arms 57.

In the base portion 53, directly beneath the slotted portions 61 of the arms 57 (when shut) are formed holes 67 adapted to receive said heads 65 when the heads are pushed therein. This positively holds the split nut arms 57 in threaded engagement with the screw 15. It may be noted from Fig. 3 that the pair of pins 63 are oppositely disposed and held in predetermined relationship by means of an external hand wheel 69. The screw 15 passes through a central opening in the hand wheel 69, and does not connect therewith (see Fig. 2).

The operation is such that when the hand wheel 69 is depressed, the heads 65 are positioned within the holes 67 and thereby lock the split nut shut on the screw 15. Hence when the hand wheel 69 is turned the screw 15 may be drawn inwardly into the U-shaped iron 1 to take up slack. If, when applying the device to a very slack cable or the like, it is desired to take up the loose slack very quickly, the hand wheel 69 is pulled so that the heads 65 are disengaged from the hole 67 and become positioned in the countersunk slots 61 of the arms 57, thereby freeing the arms 57 so that when the wheel 69 is rotated counter-clockwise, the split nut opens and disengages from the screw 15. Being in a disengaged position, the heads 65 no longer rest in the holes 67 in the base 53, but ride above the surface of said base. However, the heads cannot be pulled out farther by means of the wheel 69, because said heads 65 are positioned in the countersunk portions of the slotted ends of the arms 57. The arms 57 are suitably nested for fitting into the housing 5.

It is evident that when the screw 15 is free that it may be pushed into the U-shaped portion 1 and at the desired time the hand wheel 69 may be rotated clockwise to clamp the split nut on the screw 15. The wheel 69 is then again depressed to lock the nut shut and slack may be taken up from the crank 39 as described. A stationary ring 71 serves to enclose the arms 57.

The matter so far described has been previously set out in substance in my copending application, Serial Number 178,237, filed March 25, 1927.

It is evident that the worm 23 and worm wheel 51, as regards transmission of forces, is irreversible and hence, as will be seen, the closed nut may be left stationary and the screw operated to rotate therein to provide take up.

The invention herein, per se, is more particularly shown in Figs. 2, 4 and 5 in which is shown said cross-head 16. As before described, the cross-head 16 is normally pinned to the screw 15 to prevent rotation of said screw but permitting longitudinal movement thereof. However the cross-head is also adapted to be made rotatably independent of the screw. This is accomplished as follows:

At the end of screw 15 is permanently pinned a round head 73 (see pin 75), said head 73 being movable with the screw, both longitudinally and in rotation. This head is adapted to be rotatably borne in a recess or bearing 77 of said cross-head 16, being held in position by a cap 79.

A movable bayonet pin 81 is provided in the cross-head 16 for engaging any one of a plurality of holes 83 in the periphery of the head 73, whereby the screw can be either pinned to the cross-head for non-rotation or freed therefrom for rotation.

A detent 85 is adapted to maintain disengagement of the cross-head and the screw 15 when a button 87 is pulled out and turned. A spring 89 tends to maintain engagement when the detent is in position within its slot 91. Hence it will be seen that the spring-pressed bayonet pin and detent afford means whereby, from the button 87, an operator may either engage or disengage the screw 15 and the cross-head 16, that is, the screw may be rendered either rotatable or non-rotatable with respect to the non-rotatable but slidable cross-head 16. Hence, in rotation, the screw 15 and frame 1 may be engaged or disengaged.

A handle 93 is slidably borne crosswise in the lower end of the screw 15 for applying a torque directly to the screw.

The operation and purpose of the mechanism is as follows:

Normally the pin 81 is in the Fig. 4 position, thus joining the screw 15 and cross-head 16 for non-rotation of the screw with respect to the frame. The split nut within the casting 5 is then opened, whereupon the screw 15 may be withdrawn to partial or full extent for joining a cable to the clevises. Then the screw may be manually and directly pushed in for taking up very loose slack. This comprises one step or mode in the operation. It is to be understood that this step may be accomplished with the pin 81 withdrawn so that the screw is rotatable with respect to the cross-head 16.

For the second step the pin 81 should be raised or placed so as to permit the screw to rotate with respect to the frame. Then the split nut is closed on the screw 15 and the screw turned or fed in by means of the arm or handle 93, thereby providing in this type of slack puller a direct screw take-up for quickly applying some tension to the cable.

After the direct screw action becomes inadequate to apply the forces desired, the lever 39 may be used, through the reducing gears 23, 51, by manipulating the pin 81 so that it drops into one of the recesses 83 to prevent rotation of the screw. Then, upon turning the crank or lever 39, the reducing gears cause turning of the split nut on the screw to feed in the screw and apply the greater forces desired. The gear reduction provides the increased mechanical advantage.

The advantages are, (1) a very quick direct take-up when the split nut is open, (2) a direct screw take-up which is faster than a geared screw take-up but adapted for the application of appreciable forces, not had under advantage (1) and, (3) a slow geared screw take-up for applying greater forces.

It will be seen that this device saves all of the time which was previously required to give the many turns to crank 39 for effecting take-up from the loose to very tight condition of a cable. The end is accomplished in simple fashion.

For example, after giving a direct sliding take-up the following saving may be made, assuming five threads per inch, a twenty to one gear reduction and one inch slack to be taken out: By manipulating the screw directly only five revolutions of the relatively short handle 93 are required but one hundred revolutions of the relatively long crank 39. Hence if the forces set up by the arm 93 are adequate for, say three fifths of an inch, then seventy-seven turns are saved, only three turns of handle 93 being required and twenty turns of the crank 39, making only twenty-three actual turns instead of one hundred turns by crank 39.

Fig. 4 shows how the holding end of the pin 81 is enlarged to prevent shearing when the split nut is in driving arrangement.

It will be seen that the split nut assembly 5 and the screw 15 together constitute a helical pair. It will also be seen that what this invention effects kinematically is an inversion of the helical pair for purposes of bringing into play either one of two mechanical advantages, and a complete release of said pair for another mechanical advantage.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A slack puller comprising a frame, a housing joined thereto, a screw passing longitudinally and slidably through the housing, a split nut mounted within the housing adapted to open and close on said screw, speed reducing means for rotating said split nut, means for preventing and permitting rotation of the screw and means for applying torque directly to said screw independently of said speed reducing means.

2. A slack puller comprising a frame, a screw mounted longitudinally of and slidably with respect to said frame, a split nut adapted to open and close on said screw and geared means for rotating said nut and means adapted to prevent and permit rotation of the screw.

3. A slack puller comprising a frame, a screw mounted for longitudinal movement therein, geared means adapted to engage and disengage said screw and means permitting and preventing rotation of the screw with respect to the frame.

4. A slack puller comprising a frame, a screw mounted for longitudinal movement with respect thereto, rotatable means adapted to engage and disengage the screw for longitudinally moving the same and means permitting and preventing rotation of the screw with respect to the frame.

5. A slack puller comprising a frame, a screw mounted for longitudinal movement with respect thereto, rotatable means adapted to engage and disengage the screw for longitudinally moving the same and means permitting and preventing rotation of the screw with respect to the frame, the rotatable means being engaged and held stationary when the screw is rotatable and being engaged but rotated when said screw is made non-rotatable.

6. A slack puller comprising a frame, a screw mounted for longitudinal movement therein, rotatable means adapted to drive said screw longitudinally when said screw is prevented from rotating and means for permitting and preventing rotation of the screw with respect to the frame.

7. A slack puller comprising a frame, a screw mounted for longitudinal movement therein, rotatable driving means adapted to drive said screw longitudinally when said screw is prevented from rotating, means for permitting and preventing rotation of the screw with respect to the frame and means for turning the screw when so permitted whereby it may be fed through said driving means.

8. A slack puller comprising a frame, a screw mounted for longitudinal movement therein, rotatable driving means adapted to drive said screw longitudinally when said screw is prevented from rotating, means for permitting and preventing rotation of the screw with respect to the frame, means for turning the screw when so permitted, whereby it may be fed through said driving means and means for moving the screw longitudinally without rotation independently of said driving means and independently of said turning means.

9. A slack puller comprising a frame, a cross-head longitudinally movable therein without rotation, a screw mounted for longitudinal movement in the frame with said cross-head, manually movable means permitting and preventing rotation of the screw with respect to the cross-head, rotatable engaging means manually adapted to engage and disengage said screw and comprising a nut, said engaging means being adapted to move the screw longitudinally while engaged with the screw when said screw is not rotatable, means for turning the screw when it is rotatable, said turning being in respect to and within the said screw-engaging nut, said screw being independently movable longitudinally when said screw engaging nut is disengaged, said last-named movability being effective when the screw is rotatable or non-rotatable with respect to the cross-head.

In testimony whereof, I have signed my name to this specification this 10th day of October, 1927.

THEODORE BIRKENMAIER.